US006482281B1

(12) United States Patent
Schmidt

(10) Patent No.: US 6,482,281 B1
(45) Date of Patent: *Nov. 19, 2002

(54) HOT-MELT ADHESIVES FOR VEHICLES LIGHTS OR VEHICLE HEADLAMPS

(75) Inventor: Stephan Schmidt, Lippstadt (DE)

(73) Assignee: Hella KG Hueck & Co., Lippstadt (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/905,935

(22) Filed: Aug. 5, 1997

Related U.S. Application Data

(63) Continuation-in-part of application No. PCT/EP96/00536, filed on Feb. 9, 1996.

(30) Foreign Application Priority Data

Feb. 10, 1995 (DE) .......................................... 195 04 425

(51) Int. Cl.$^7$ ........................ C09J 123/00; C09J 153/02
(52) U.S. Cl. ........................ 156/108; 156/334; 362/267; 362/546; 524/490; 525/71; 525/92 R; 525/98
(58) Field of Search ................................. 362/267, 546; 525/71, 92 R, 98; 156/108, 334; 524/490

(56) References Cited

U.S. PATENT DOCUMENTS

| | | | |
|---|---|---|---|
| 3,991,025 A | | 11/1976 | Kutch et al. |
| 4,783,504 A | | 11/1988 | St. Clair et al. |
| 4,857,594 A | | 8/1989 | Lakshmanan et al. |
| 5,169,890 A | * | 12/1992 | Eadara ........................ 525/98 |
| 5,571,530 A | * | 11/1996 | Nakano ....................... 424/448 |
| 5,686,179 A | * | 11/1997 | Cotsakis ..................... 524/505 |

FOREIGN PATENT DOCUMENTS

| | | | |
|---|---|---|---|
| FR | 2394743 | * | 2/1979 |
| JP | 016888 | * | 1/1989 |
| JP | 162730 | * | 7/1991 |

OTHER PUBLICATIONS

Abstract of J62053386.*

Chemical Abstract/Derwent Abstract of J03162730.*

Abstract of J62156183.

Abstract of J55048235.

* cited by examiner

Primary Examiner—David J. Buttner
(74) Attorney, Agent, or Firm—Brobeck Phleger & Harrison, LLP

(57) ABSTRACT

The present invention is drawn to hot-melt adhesives for bonding vitreous plastic materials to thermoplastic or thermosetting plastic materials, and to the use of these adhesives for making vehicle lamps or headlamps comprising lenses, especially bearing a scratch-proofing coating, made of a vitreous plastic material, and lamp bodies made of a thermoplastic or thermosetting plastic material, where the lenses and lamp bodies are bonded together with these hot-melt adhesives. The hot-melt adhesives of this invention are characterized in that they contain:

a) from 0.5 to 15% by weight of optionally grafted thermoplastic elastomers;
b) from 5 to 40% by weight of optionally grafted poly-α-olefins except polyisobutylene;
c) from 5 to 45% by weight of adhesive resins; and
d) from 5 to 55% by weight of polyisobutylenes.

38 Claims, 2 Drawing Sheets

HOT-MELT ADHESIVES FOR VEHICLES LIGHTS OR VEHICLE HEADLAMPS

This application is a continuation-in-part of international application Ser. No. PCT/EP96/00536, designating the U.S., filed on Feb. 9, 1996.

The present invention pertains to hot-melt adhesives for bonding vitreous plastic materials to thermoplastic or thermosetting plastic materials, as well as their use for bonding lenses to lamp bodies of vehicle lamps or headlamps, as well as the vehicle lamps or headlamps prepared using said hot-melt adhesives.

Hot-melt adhesives belong to the physically setting type of adhesive which mostly solidify without chemical cross-linking or evaporation of solvents, only due to a congealing process with decreasing temperature. Reactive hot-melt adhesives set after the mounting and achieve their final strength through a subsequent chemical reaction (cross-linking).

Hot-melt adhesives have a number of advantages over chemically reacting and solvent-containing adhesives:

- absence of solvents or monomers and thus little environmental and industrial safety requirements;
- dosage and mixing errors by machines or the staff are not possible;
- very short setting times of a few seconds to about one minute; and
- thermally undoable assembly.

However, some fundamental disadvantages also result therefrom:

- tendency to creeping, mainly at elevated temperature and permanent static load;
- heat load of the assembly members in the application of the hot-melt adhesives;
- relatively low level of temperature resistance as compared to chemically cross-linking systems; and
- necessity of providing appropriate melting plants, the working viskosities of hot-melt adhesives being essentially higher, as a rule, than those of two-component or solvent-containing adhesive systems.

Hot-melt adhesives known in the prior art are predominantly made of the materials polyamide, saturated polyesters or polyurethanes, and ethylene-vinyl acetate copolymers. In addition, non-polar butyl sealant compositions are frequently found in sealing and mounting technologies. These systems are generally composed of tackifying resins, backbone polymers, flexibilizers, fillers, stabilizers and adhesion promoters.

The melting behavior is usually not sharply limited to a narrow range of temperatures, but comprises a melting range over a temperature difference of 20 to 100° C. This is also the amount by which the maximum temperature of use is at least different from the minimum application temperature.

In order to achieve special desired properties, especially suitable components having quite different melting and/or softening ranges, different molecular weights and in part critical compatibilities must be blended together to give as homogeneous as possible a hot-melt adhesive.

Since the polymers used in the prior art also in part have molecular weights of around $10^6$ g/mol, high shearing forces must be active during the blending. In order to treat the higher molecular weight polymers gently in this process and generally to accelerate dissolution processes, the materials, as is well-known, are incorporated in one another at elevated temperature in a suitable mixing apparatus. This may be, for example, a twin-screw kneader in which the hot-melt adhesive is blended at about 100 to 200° C., usually 120 to 160° C. As an example of the very extensive prior art, reference is made to U.S. Pat. No. 4,857,594-A which describes a hot-melt adhesive which is particularly suitable for bonding polyolefin moldings to identical or other polyolefin moldings as well as other, non-polyolefin moldings.

This hot-melt adhesive consists of (A) from 60 to 100% by weight of a mixture consisting of an amorphous polypropylene (α-polyolefin), a block copolymer selected from the group consisting of styrene-ethylene/butene-1 block copolymers and styrene-ethylene/propylene block copolymers, and a tackifying hydrocarbon resin wherein said amorphous polypropylene has a crystallinity of less than 10% by weight and a molecular weight in the range of from 300 to 50 000, and said hydrocarbon resin has a ring and ball softening point in the range of about 10° C. to 150° C., the components being present in the following relative amounts:
amorphous polypropylene from 5 to 95% by weight
block copolymer from 2.5 to 40% by weight; and
hydrocarbon resin from 2.5 to 55% by weight; and (B) from 0 to 5% by weight, based on the weight of the finished hot-melt adhesive, of an antioxidant; and (C) from 0 to 40% by weight, based on the weight of the finished adhesive composition, of a compound or mixture of compounds selected from the group consisting of an isotactic polypropylene, ethylene-propylene copolymers, paraffin and microcrystalline waxes, Fischer-Tropsch waxes, low-molecular weight polybutenes, polyisobutylene, low-molecular weight polyethylenes, low density polyethylene, and process oils.

Due to the kind of substrates to be bonded together, i.e. essentially thermoplastic polyolefins, the range of materials to be used is wide. In special applications, however, the basic formulations are too expensive and usually unsuited for permanently bonding, for example, vitreous surfaces, such as polycarbonate.

U.S. Pat. No. 4,783,504-A describes a solvent-free hot-melt adhesive which is said to be suitable, inter alia, for sealing insulating glass or vehicle headlamps with glass lenses. The composition comprises (a) 100 parts by weight of a silane-functionalized polymer component, and (b) a certain amount of a medium block component compatible therewith for controlling the glass transition temperature. Said silane-functionalized polymer is employed in order to achieve adhesion to glass.

Lenses made of vitreous plastic materials are connected to lamp bodies in the prior art usually with sealant materials and mechanical fixation by clamps. First, the lens is provided with a scratchproofing coating, especially by spraying and subsequent curing under UV irradiation.

The sealant materials proposed in the prior art for sealing the space between the lamp body and the plastic lens required a mechanical fixation of the lens, for example, with clamps, in order to ensure a permanent custom-fit positioning during the use of the vehicle.

Accordingly, it has been the object of the present invention to provide, in particular inexpensive, hot-melt adhesives for bonding vitreous plastic materials to thermoplastic or thermosetting plastic materials.

In a first embodiment, the above-mentioned object is achieved by hot-melt adhesives for bonding vitreous plastic materials to thermoplastic or thermosetting plastic materials, containing:

a) from 0.5 to 15% by weight, in particular from 0.5 to 10% by weight, of optionally grafted thermoplastic elastomers;

b) from 5 to 40% by weight, in particular from 10 to 35% by weight, of optionally grafted α-polyolefins;

c) from 5 to 45% by weight, in particular from 15 to 40% by weight, of adhesive resins; and d) from 5 to 55% by weight, in particular from 15 to 45% by weight, of polyisobutylenes.

The hot-melt adhesives according to the invention can be manufactured in cartridges or barrel-like containers or as an open bulk material. When cartridges are used, the whole adhesive is frequently heated and processed by means of a manual applicator. In the case of larger barrel-like containers, a heated die having a removal and conveying line is brought on the surface of the hot-melt adhesive in a stationary plant, and the adhesive is removed only from the surface region. This involves heating of only part of the hot-melt adhesive. Since the hot-melt adhesive is forcibly conveyed, there are no high requirements to its flow characteristics in this kind of application technique.

On the other hand, this cumbersome provision of the hot-melt adhesive can be dispensed with by employing an open bulk material, optionally with adhesive paper as a separating layer, using tank melting plants. In this case, blocks of hot-melt adhesive are added into a heated tank, and the melt is supplied to the application nozzle via a pump, entering through the removal opening positioned at the bottom.

In this way of providing the hot-melt adhesive melt for conveying, dosage and application to the substrates, higher requirements are demanded of the conveying and flowing characteristics of the hot-melt adhesive. As compared with conventional hot-melt adhesives, the conveyability of the hot-melt adhesives according to the invention is of particular importance.

The flowability of the hot-melt adhesive is determined, in particular, by the choice of high-molecular weight fractions. If, for example, only low-molecular weight fractions and minute amounts of high-molecular weight materials are employed, a sufficient cohesive strength cannot be achieved.

In addition, significant differences with respect to the prior art can be seen in the reversibility of the hot-melt adhesives according to the invention. In addition to the setting of hot-melt adhesives, which is mainly based on physical effects, it is also possible, evidently, to combine these effects with an additional chemical cross-linking.

Replacing thermoplastic elastomers by cross-linked butyl rubber results in a lesser reversibility, although a well-flowable hot-melt adhesive can also be realized using such polymers.

Especially mechanism of failure, i.e. cohesive or adhesive failure, is of particular importance according to the invention. By means of the present invention, a cohesive failure mechanism is obtained with maximum amounts of tensile strength and crack resistance. For cold flexibility, high polyisobutylene contents are required. According to the invention, it is shown that the excellent values of adhesion to all substrates to be bonded in mutual combination of the raw materials could be achieved, in particular, by the modification with hydrocarbon resins. Good adhesion to thermoplastic materials is achieved mainly by α-polyolefins, especially maleic anhydride grafted α-polyolefins. The main important fact is that the substrates can be assembled as-sprayed using the hot-melt adhesives according to the invention without a special additional treatment which is to enable adhesion of the adhesives to the substrates.

DETAILED DESCRIPTION OF THE DRAWINGS

Figure 1:
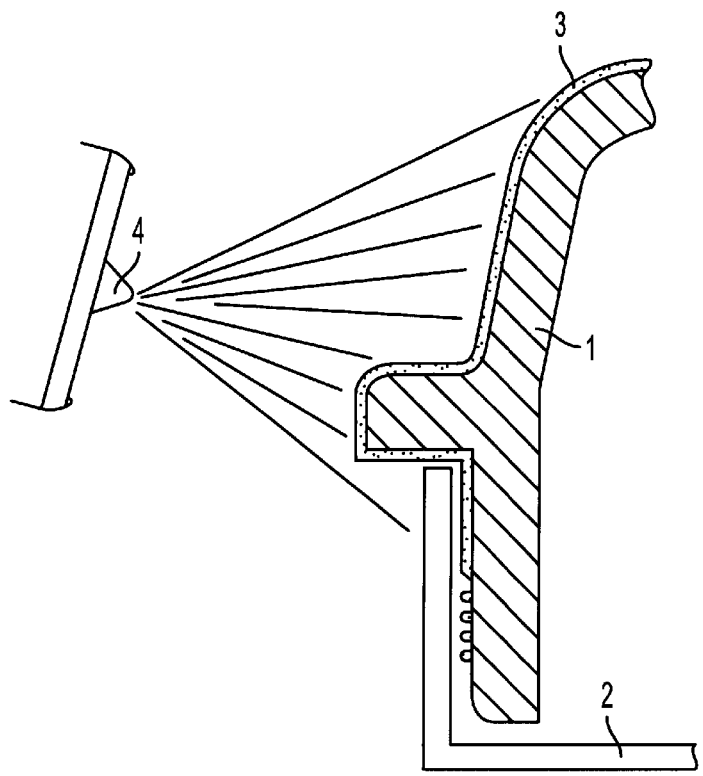
FIGS. 1 to 3 represent the basic construction of the connection of a lens of a motor vehicle with a body 6.

The lens 1 is provided with paint system 3 for scratchproofing. To this end, lens 1 is positioned in a cover frame 2, and the paint 3 is applied onto the desired surface using the spraying nozzle 4.

Figure 2:
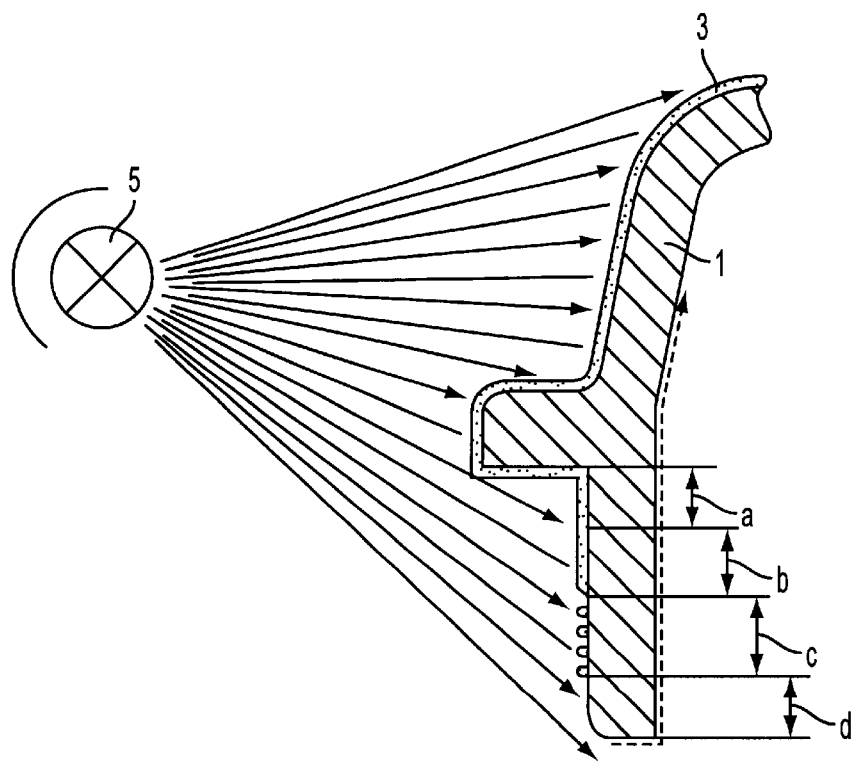

Thereafter, as shown in FIG. 2, the paint is subjected to final curing either with the application of heat and/or UV irradiation 5 to form a thermoset coating. Especially preferred according to the present invention is curing by UV irradiation.

In the paint coating process, it has to be considered that paint mist passes through the gap between cover frame 2 and lens 1, especially onto the outer base of the lens. In a further run, the whole surface, the outer surface of the base and, with decreasing intensity, the bottom and inner sides of the base of the lens are subjected to UV irradiation.

FIG. 2 represents the various substrate surfaces of the lens.

The paint 3 of the scratchproofing coating which is to be cured by UV irradiation 5 covers a major portion of the surface of lens 1. Said major portion of the surface will be entirely coated and also exposed to the cross-linking UV radiation.

It is to be considered that in region a) of FIG. 2, the whole surface of lens 1 is coated with the paint which, however, is not exposed to the maximum intensity of UV irradiation 5, but is nevertheless cross-linked. This is followed by region b) in which the surface of lens 1 is entirely coated with the paint which, at this site, is also subjected to the maximum UV irradiation 5.

In addition, due to the positioning within a cover frame 2, a surface region c) will be present in which the surface of lens 1 is only partially coated; this coating is also cross-linked by UV irradiation 5. This is followed by the non-coated region d) which is not coated, but subjected to the UV irradiation.

At the bottom side of the lens base and at the inner backside of lens 1, a further region of the surface of lens 1 will be neither coated nor irradiated.

Figure 3:
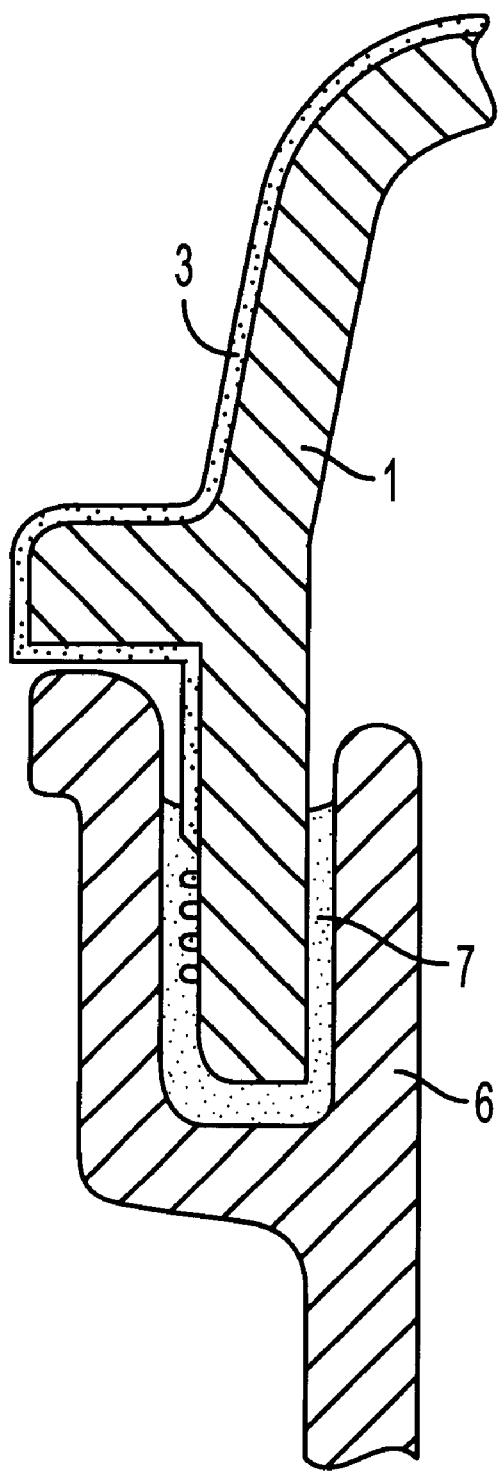

FIG. 3 represents the finished connection between the plastic lens 1 provided with a scratchproofing coating 3 and the lamp body 6 through adhesive 7.

In order that an adequate tightness of the headlamp may be ensured by a sealant composition 7, it must not become detached from the various substrate surfaces, not even upon the action of media such as water, cleaning solutions, sealants and dewaxing agents.

The adhesion of the hot-melt adhesives according to the invention is on such a high level that no detaching from the substrates occurs at the usual temperatures of use of motor vehicles. In addition, the composition cannot be displaced from the joint. Its strength at temperatures of use is clearly increased as compared with conventional hot-melt adhesives. The hot-melt adhesives according to the invention have the capability of transmitting higher adhesive than cohesive forces so that cohesive fractures preferably occur in destroying tests.

At very low temperatures, for example, at −30° C., the hot-melt adhesive is not yet brittle or too hard since otherwise its capability of cohesively transmitting forces will suddenly highly increase without the adhesion being able of increasing to the same extent. Therefore, a sufficient cold flexibility is required according to the invention.

For working the composition, in contrast, it is important that it is sufficiently flowable above the maximum temperature of use to be anticipated in order to be conveyed by the usually application plants for hot-melt adhesives.

A conventional hot-melt adhesive cannot be processable in tank plants at room temperature at a given sufficient strength. The desired profile of properties according to the invention can only be obtained by the use of the components according to the invention, i.e. polyisobutylenes for cold flexibility, resins for adhesion to the substrates, thermoplastic elastomers for cohesive strength and molten flowability in combination with optionally grafted α-polyolefins.

Thermoplastic elastomers are per se known in the prior art. They are meant to comprise polymers which are also called thermoplastic rubbers and which, in the ideal case, possess a combination of the performance characteristics of elastomers and the working properties of thermoplastics.

This can be achieved if soft and elastic segments having a high elongation and low glass transition temperature are present in the respective plastics simultaneously with hard, crystallizable segments having a low elongation, a high glass transition temperature and tendency to the formation of associations. Characteristic of thermoplastic elastomers are thermolabile, reversibly cleavable cross-links, mostly physical, but also chemical in nature. According to the invention, the thermoplastic elastomers are preferably selected from styrene types, especially SBS, SIS, SEBS and SEPS, from elastomer alloys, especially EPDM/PP, NR/PP, EVA/PVDC and NBR/PP, and from polyurethanes, polyether esters and polyether amides. It is the thermoplastic elastomers, in particular, which cause the cohesive strength of the hot-melt adhesives according to the invention.

Especially the cohesive strength can be enhanced by the use of optionally grafted thermoplastic elastomers according to the invention if chemical cross-linking occurs through these after working the hot-melt adhesive. According to the invention, the cohesive strength at elevated temperatures is clearly improved thereby.

In a preferred embodiment of the present invention, the optionally grafted α-polyolefins are selected from amorphous α-polyolefins, the monopolymers, copolymers or terpolymers of the monomers ethene, propene, 1-butene, 1-pentene and 1-hexene, or an α-polyolefin of general formula (I)

$$\left[\begin{array}{c} CH_2-CH- \\ | \\ C_mH_{2m+1} \end{array}\right]_n \tag{I}$$

with
  m=0 to 15, and
  n=5 to 2000.

These polyolefins cause the necessary adhesion to the substrates. It is particularly preferred that the α-polyolefins have partial crystallinity so that particularly preferred α-polyolefins, especially polyethylene, polypropylene and/or poly-1-butene, exhibit a high tacticity in the crystalline region.

In order to achieve the object of the present invention, it is particularly preferred to reduce the total amount of the expensive starting materials, such as thermoplastic elastomers. According to the invention, it has been found that it is possible to reduce the total amount of thermoplastic elastomers, α-polyolefin and adhesive resin to less than 60% by weight. With these inexpensive hot-melt adhesives, excellent adhesion performances could be achieved in the bonding of vitreous plastic materials to thermoplastic or thermosetting plastic materials.

The above defined α-polyolefins and thermoplastic elastomers may optionally be grafted with other compounds. Particularly preferred is random grafting with olefinically unsaturated compounds which are, in particular, selected from maleic anhydride, itaconic anhydride, tetrahydrophthalic anhydride and compounds of general formula (II)

$$\begin{array}{c} R_1 \\ \diagdown \\ R_2 \end{array} C=C \begin{array}{c} R_3 \\ \diagup \\ R_4 \end{array} \tag{II}$$

wherein
  $R_1$ represents residues of the kind
  a)

$$-X_n-\overset{Z_m}{\underset{|}{Si}}-Y_{4-n-m}$$

wherein
  Z represents hydrogen, a methyl residue or a phenyl residue;
  X represents $$-(CH_2)_l-$$ or $$\left[\begin{array}{c}\phantom{xx}\\ \diagup\diagdown\\ \diagdown\diagup\end{array}-CH_2-\overset{H}{\underset{H}{N}}-CH_2-CH_2-\right]^{\oplus} Cl^{\ominus}$$

Y represents any hydrolyzable group;
m represents an integer of 0, 1 or 2;
n represents an integer of 0, 1 or 2; and
l represents an integer of 1, 2, 3, 4, 5, or 6; or
b)

$$-(CH_2)_k-C\overset{O}{\underset{OH}{\diagup\diagdown}}$$

wherein
  k represents an integer of 0, 1 or 2;
  $R_2$ represents hydrogen or methyl;
  $R_3$ represents a residue $R_1$, hydrogen or methyl; and
  $R_4$ represents hydrogen or methyl.

According to the invention, the proportion of grafted α-polyolefins may comprise between 0 and 50% by weight, based on the total content of α-polyolefins.

The proportion of grafted thermoplastic elastomers may be from 0 to 100% by weight, based on the content of thermoplastic elastomers.

Besides the optionally grafted polyolefins, the predominantly modified aliphatic resins are particularly responsible for the adhesion to the substrates. These are preferably selected from the polymerized monomers of the $C_5$ to $C_9$ cut of petroleum distillation which are not or but partially hydrogenated and natural colophonium resins and their modifications; terpene resins; polyterpene resins of β-pinene, α-pinene and/or δ-limonene, and resins obtainable by the copolymerization of terpenes with monomers from the $C_5$ to $C_9$ cut of petroleum distillation and terpene phenol resins. Particularly preferred are resins which contain aromatic bonds. The adhesive resins which are not or but partially hydrogenated, especially containing aromatic bonds, impart particularly good properties to the hot-melt adhesives according to the invention, especially in view of the substrates to be bonded together.

As mentioned above, the polyisobutylenes to be employed according to the invention are responsible for cold flexibility. According to definition, the polyisobutylenes according to this invention include, in particular, polyisobutylene oils and copolymeric polyisobutylenes. Particularly preferred are the polyisobutylenes made of homopolymeric isobutylene, especially homopolymers of isobutylene having an average molecular weight as determined by gel permeation chromatography in the range of from 20,000 to 5,000,000 g/mol, copolymers of isobutylene and a conjugated diene in an amount of 0.3 to 4.5 mole %, based on the copolymer, and/or terpolymers of isobutylene, divinyl benzene in an amount of 0.01 to 4.5 mole %, and the above conjugated diene.

Both cold flexibility and melt viscosity are beneficially influenced by the oils, such as oligomers and polymers of isobutene and 1-butene having an average molecular weight of from 200 to 20,000 g/mol as determined by gel permeation chromatography, and naphthene- or paraffin-based oils in the same range of molecular weights obtained by petroleum distillation and optionally modified. According to the invention, the proportion of such oils should be in the range of from 0 to 30% by weight, based on the hot-melt adhesive.

In addition to the above mentioned organic polymeric plastic materials, the hot-melt adhesives according to the invention may also contain further fillers as well as, in particular, aromatic resins and/or stabilizers.

It is particularly preferred to employ from 0 to 50% by weight, especially from 0 to 40% by weight, of fillers, and/or from 0 to 10% by weight, especially from 0 to 2.5% by weight, of aromatic resins and/or stabilizers.

In particular, the fillers may be selected from inorganic fillers, for example, calcium carbonate, dolomite, titanium dioxide, zinc oxide, silica, baryte and manganese dioxide, as well as organic fillers, especially carbon black.

The stabilizers which are optionally present in the hot-melt adhesives according to the invention are selected from the group consisting of epoxides, sterically hindered phenols, amines, thioesters, phosphites, and triazine derivatives, piperidine derivatives and benzotriazoles.

The hot-melt adhesives according to the invention are particularly useful for the bonding of vitreous plastic materials to thermoplastic or thermosetting plastic materials. The substrates to be assembled in the field of vehicle lamps and headlamps include, in particular, polypropylene as a body material, and polymethyl methacrylate or polycarbonate as a material for the lenses. However, other plastic materials may also be employed in the same way. An identical feature of all sealing and bonding problems in lamps is that the substrate surface is in its original condition or as given by the preceding molding process, i.e. it is not substantially modified.

This is not the case with headlamps having plastic lenses, due to the scratchproofing coating. Here, a sufficient adhesion between a wide variety of different possible substrate surfaces with fluid property changes must be produced in the adhesion to the base of the lens.

Therefore, another embodiment of the present invention comprises vehicle lamps or headlamps comprising a lens made of a vitreous plastic material and a lamp body made of a thermoplastic or thermosetting plastic material, characterized in that said lens and said lamp body are bonded together by means of a hot-melt adhesive as defined above.

EXAMPLES

Example 1

The polyisobutylene or butyl rubber as defined hereinbelow was charged in a twin-screw kneader maintained at 150° C.

About ¼ of the total amount of the plastifying oil as defined hereinbelow was added thereto, followed by blending for about 30 min. To this homogenized mass, the thermoplastic elastomer was added, followed by blending for another 30 minutes.

Thereafter, any required end block resins, fillers and/or stabilizers were added, and another ¼ of the total amount of plastifying oils was added, followed by blending for another 20 min.

To this mixture, two portions were added, each with half of the adhesive resin and the α-polyolefins which may optionally be grafted.

After each addition, the mixture was kneaded for another 15 min.

Then, the remaining plastifying oils, i.e. ½ of the total amount thereof, was added, followed by blending for another 30 min, until a homogeneous hot-melt adhesive composition could be obtained from the kneader.

thermoplastic elastomer—10% by weight, Kraton® G1657 (linear styrene block copolymer of S-EB-S/SEB type, 13% of styrene, 65% of SEB-S);

α-polyolefin—20% by weight, D-7682-138 (amorphous polypropylene homopolymer; softening temperature (r&b)=150° C., $T_g$=−10° C.);

adhesive resin—30% by weight, Escorez® 2101 (aliphatic resin with aromatic groups, softening temperature (r&b)=93° C.);

butyl rubber—15% by weight, Butyl 100 (polyisoprene/isobutylene) copolymer, molecular weight 310,000 g/mol); and plastifying oil—25% by weight, Parapol® 950 (polyisobutylene, molecular weight determined by gel permeation chromatography with respect to polystyrene standards to be 1,400 g/mol).

Example 2

In analogy to example 1, the following components were blended together:

thermoplastic elastomer—6.1% by weight, Tufprene® A (linear styrene block copolymer of S-B-S type, 40% of styrene);

α-polyolefin—20.1% by weight, P-1824-005 (amorphous polypropylene homopolymer, grafted with maleic anhydride; softening temperature (r&b)=145° C., $T_g$=−10° C.);

adhesive resin—37.5% by weight, Wingtack® 86 (synthetic terpene resin with aromatic groups, softening temperature (r&b)=88° C.);

butyl rubber—20.1% by weight, Butyl 100;

plastifying oil—15.4 by weight, Paramin S® ECA 10788 (polyisobutylene, molecular weight determined by gel permeation chromatography with respect to polystyrene standards to be 4,200 g/mol); and organic filler—0.8% by weight, Printex® 75 (carbon black, dibutyl phthalate adsorbed, 45–50 ml (DBP)/100 g).

Example 3

In analogy to example 1, the following components were blended together:

- thermoplastic elastomer—9.3% by weight, Kraton® RP 6501 (linear styrene block copolymer of S-EB-S type, grafted with about 2% of silane);
- α-polyolefin—32.5% by weight, D 7682-139 (amorphous poly(propylene/1-butene) copolymer; softening temperature (r&b)=98° C., $T_g$=−25° C.);
- adhesive resin—21.1% by weight, Super STATAC® 80 (aliphatic resin with aromatic groups, softening temperature (r&b)=82° C.);
- polyisobutylene—7.4% by weight, Oppanol® B100 (molecular weight determined by gel permeation chromatography with respect to polystyrene standards to be 870,000 g/mol);
- polyisobutylene—11.1% by weight, Oppanol® B10 (molecular weight determined by gel permeation chromatography with respect to polystyrene standards to be 66,000 g/mol);
- plastifying oil—9.3% by weight, Oppanol® B3 (polyisobutylene, molecular weight determined by gel permeation chromatography with respect to polystyrene standards to be 2,000 g/mol); and
- inorganic filler—9.3% by weight, Socal® U1S2K (precipitated calcium carbonate with calcite structure, average particle size=0.08 μm).

Comparative Example 1

In analogy to example 1, the following starting components were blended together:

- thermoplastic elastomer—0.3% by weight, Finaprene® 411 (radial styrene block copolymer of S-B-S type, 32% of styrene);
- α-polyolefin—5% by weight, Vestoplast® 520 (copolymeric α-polyolefin with high 1-butene content; softening temperature (r&b)=90° C., $T_g$=−25° C.);
- adhesive resin—19.7% by weight, Zonatac® 85 1 (terpene resin with aromatic groups, softening temperature (r&b)=89° C.);
- partially cross-linked butyl rubber—5% by weight, Butyl XL® 30102 (poly(isoprene/isobutylene) copolymer, cross-linked through divinylbenzene);
- polyisobutylene—5% by weight, Oppanol® B150 (molecular weight determined by gel permeation chromatography with respect to polystyrene standards to be 1,700,000 g/mol);
- plastifying oil—10% by weight, Oppanol® B3; and
- plastifying oil—15% by weight, Berulub® Fluid HC-400 (poly-1-decene oil); and
- inorganic filler—40.0% by weight, Sikron® SH 300 (ground quartz powder, average particle size=11 μm).

Comparative Example 2

In analogy to example 1, the following starting components were blended together:

- thermoplastic elastomer—9.7% by weight, Kraton® G1652 (linear styrene block copolymer of S-EB-S type, 29% of styrene);
- thermoplastic elastomer—9.0% by weight, Kraton® RP6501 (linear styrene block copolymer of S-EB-S type, grafted with about 2% of silane);
- α-polyolefin—13.6% by weight, D-7682-139;
- adhesive resin—22.5% by weight, Escorez® 2101;
- polyisobutylene—7.2% by weight, Oppanol® B100;
- polyisobutylene—13.6% by weight, Oppanol® B10;
- plastifying oil—15.4% by weight, Oppanol® B3; and
- inorganic filler—9.0% by weight, Socal® U1S2K.

Comparative Example 3

In analogy to example 1, the following starting components were blended together:

- thermoplastic elastomer—0% by weight;
- α-polyolefin—15% by weight, P-1824-005;
- adhesive resin—20% by weight, Escorez® 2101;
- polyisobutylene—10% by weight, Oppanol® B150;
- polyisobutylene—10% by weight, Oppanol® B100;
- polyisobutylene—10% by weight, Oppanol® B15;
- plastifying oil—15% by weight, Oppanol® B3; and
- inorganic filler—20% by weight, Socal® U1S2K.

In the following tables 1 to 3, the flowability under close-to-working conditions is shown as a measure for workability (table 1), the different reversibilities without and with additional loading are shown (table 2), and the tensile strength and crack resistance are shown as a measure for cohesion and adhesion to the various substrates (table 3).

TABLE 1

| Example | 1 | 2 | 3 | Comp. 1 | Comp. 2 | Comp. 3 |
|---|---|---|---|---|---|---|
| Flowability 180° C. [g/s] at 1.5 bar, diameter = 4 mm | 2.1 | 2.2 | 4.0 | 7.6 | 1.0 | 7.9 |

TABLE 2

| Example | 1 | 2 | 3 | Comp. 1 | Comp. 2 | Comp. 3 |
|---|---|---|---|---|---|---|
| reversion [%] after 200% stretching without load | 92 | 88 | 75 | 60 | 96 | 26 |
| reversion [%] after 200% stretching with a load of 4.5 mN.mm$^{-2}$ | 88 | 70 | 68 | −40 | 94 | tears within testing period |

TABLE 3

| Example | 1 | | 2 | | 3 | | Comp. 1 | | Comp. 2 | | Comp. 3 | |
|---|---|---|---|---|---|---|---|---|---|---|---|---|
| max. tensile strength [N/mm$^2$] on different substrates: | | | | | | | | | | | | |
| PP | 0.61 | K | 0.81 | K | 0.70 | K | 0.09 | K + K* | 0.33 | K + A | 0.34 | K |
| PMMA | 0.41 | K + K* | 0.89 | K | 0.70 | K | 0.08 | K + K* | 0.33 | K + A | 0.36 | K |

TABLE 3-continued

| Example | 1 | | 2 | | 3 | | Comp. 1 | | Comp. 2 | | Comp. 3 | |
|---|---|---|---|---|---|---|---|---|---|---|---|---|
| PC | 0.51 | K | 0.80 | K | 0.67 | K | 0.08 | K + K* | 0.32 | K + A | 0.27 | K + K* |
| PC (UV) | 0.51 | K | 0.66 | K + K* | 0.68 | K | 0.13 | K | 0.33 | K + A | 0.32 | K + K* |
| max. crack resistance [kJ/m²] on different substrates: | | | | | | | | | | | | |
| PP | 8.5 | K* | 6.4 | K + K* | 7.5 | K + K* | 3.2 | K | >15.0 | K | 4.3 | K + A |
| PMMA | 9.6 | K + K* | 12.8 | K + K* | 8.5 | K | 3.2 | K | >15.0 | K | 5.3 | K + K* |
| PC | 6.9 | K + K* | 1.6 | K* | 6.4 | K* | 3.2 | K | 3.2 | A | 6.4 | K |
| PC (UV) | 12.8 | K + K* | 3.2 | K* | 7.5 | K + K* | 3.2 | K + A | 5.3 | A | 6.4 | K | wherein K = cohesive failure,
A = adhesive failure,
K* = cohesive fracture in the interface.
The measuring values have been determined 24 h after assembling.

What is claimed is:

1. A method for bonding plastic materials comprising:

providing a vitreous plastic material;

providing a second plastic material, said second plastic material selected from the group consisting of thermoplastic materials and thermosetting plastic materials;

bonding said vitreous plastic materials to said second plastic material with a hot-melt adhesive containing:
(a) from 0.5 to 15% by weight thermoplastic elastomers wherein the thermoplastic elastomers comprise grafted thermoplastic elastomers in a quantity of 0 to 100% by weight of total thermoplastic elastomers content;
(b) from 5 to 40% by weight poly-α-olefins wherein the poly-α-olefins comprise grafted poly-α-olefins;
(c) from 5 to 45% by weight adhesive resins;
(d) from 15 to 55% by weight polyisobutylenes, wherein the polyisobutylenes comprise polyisobutylene oils having an average molecular weight of from 200 to 20,000 g/mol in a quantity of 0 to 30% by weight of total adhesive;
(e) from 0 to 50% by weight fillers; and
(f) from 0 to 10% by weight aromatic resins, stabilizers, or a combination thereof, wherein the total amount of thermoplastic elastomers, poly-α-olefins, and adhesive resins is equal to or less than 63.7% by weight.

2. The method of claim 1, wherein the hot-melt adhesive contains from 0.5 to 10% by weight thermoplastic elastomers, wherein the thermoplastic elastomers comprise grafted thermoplastic elastomers in a quantity of 0 to 100% by weight of total thermoplastic elastomers content.

3. The method of claim 1, wherein the hot-melt adhesive contains from 10 to 35% by weight poly-α-olefins.

4. The method of claim 1, wherein the hot-melt adhesive contains from 15 to 40% by weight adhesive resins.

5. The method of claim 1, wherein said thermoplastic elastomers are selected from the group consisting of styrene-containing thermoplastic elastomer, elastomer alloys, polyurethane, polyether esters, and polyether amides.

6. The method of claim 1, wherein said poly-α-olefins are selected from the group consisting of amorphous poly-α-olefins, homopolymers, copolymers, and terpolymers of the monomers ethene, propene, 1-butene, 1-pentene and 1-hexene, and poly-α-olefins of general formula (I)

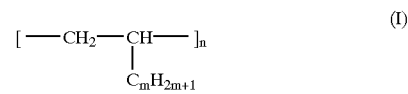

wherein m=0 to 15, and n=5 to 2000.

7. The method of claim 6, wherein said poly-α-olefins have partial crystallinity.

8. The method of claim 6, wherein said poly-α-olefins are random grafted with olefinically unsaturated compounds selected from the group consisting of maleic anhydride, itaconic anhydride, tetrahydrophthalic anhydride, and compounds of general formula (II)

wherein $R_1$ represents residues of the kind (a)

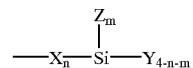

wherein

Z represents hydrogen, a methyl residue or a phenyl residue;

X represents

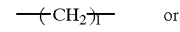

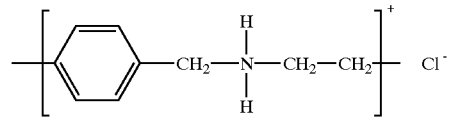

Y represents any hydrolyzable group;
m represents an integer of 0, 1 or 2;
n represents an integer of 0, 1 or 2; and
l represents an integer of 1, 2, 3, 4, 5, or 6; or (b)

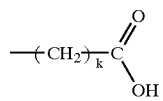

wherein
k represents an integer of 0, 1 or 2;
$R_2$ represents hydrogen or methyl;
$R_3$ represents a residue $R_1$, hydrogen or methyl; and
$R_4$ represents hydrogen or methyl.

9. The method of claim 8, wherein said thermoplastic elastomers are random grafted with olefinically unsaturated compounds selected from the group consisting of maleic anhydride, itaconic anhydride, tetrahydrophthalic anhydride, and compounds of said general formula (II).

10. The method of claim 1, wherein said adhesive resins are selected from the group consisting of polymerized monomers of the petrochemical $C_5$ to $C_9$ cut which are not hydrogenated, or are partially hydrogenated, polymerized monomers of the petrochemical $C_5$ to $C_9$ cut which contain aromatic groups, natural colophonium resins and their modifications, terpene resins, polyterpene resins of β-pinene, polyterpene resins of α-pinene, polyterpene resins of δ-limonene, and resins obtainable by the copolymerization of terpenes with monomers from the $C_5$ to $C_9$ cut of petroleum distillation and terpene phenol resins or combinations thereof.

11. The method of claim 1, wherein the polyisobutylenes are selected from a group consisting of homopolymers of isobutylene having an average molecular weight as determined by gel permeation chromatography in the range of from 20,000 to 5,000,000 g/mol, copolymers of isobutylene and a conjugated diene in an amount of 0.3 to 4.5 mole %, based on the copolymer, and terpolymers of isobutylene, divinyl benzene in an amount of 0.01 to 4.5 mole %, and the above conjugated diene, or combinations thereof.

12. The method of claim 1, wherein said polyisobutylenes are selected from the group consisting of polyisobutylene oils, oligomers of isobutylene or 1-butene, polymers of isobutylene or 1-butene, and naphthene- or paraffin-based oils obtained by petroleum distillation which are optionally modified and have a average molecular weight in the range of from 200 to 20,000 g/mol as determined by gel permeation chromatography.

13. The method of claim 1, wherein said fillers are selected from a group consisting of calcium carbonate, dolomite, titanium dioxide, zinc oxide, silica, baryte, manganese dioxide, and organic fillers.

14. The method of claim 1, wherein said stabilizers are selected from the group consisting of epoxides, sterically hindered phenols, amines, thioesters, phosphites, triazine derivatives, piperidine derivatives and benzotriazoles.

15. The method of claim 7, wherein said poly-α-olefins are random grafted with olefinically unsaturated compounds selected from the group consisting of maleic anhydride, itaconic anhydride, tetrahydrophthalic anhydride, and compounds of general formula (II)

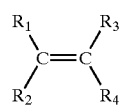

(II)

wherein
$R_1$ represents residues of the kind
(a)

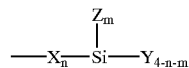

wherein
Z represents hydrogen, a methyl residue or a phenyl residue;
X represents

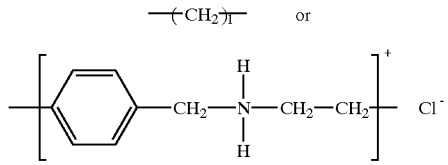

Y represents any hydrolyzable group;
m represents an integer of 0, 1 or 2;
n represents an integer of 0, 1 or 2; and
l represents an integer of 1, 2, 3, 4, 5, or 6; or
(b)

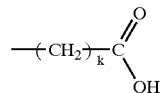

wherein
k represents an integer of 0, 1 or 2;
$R_2$ represents hydrogen or methyl;
$R_3$ represents a residue $R_1$, hydrogen or methyl; and
$R_4$ represents hydrogen or methyl.

16. The method of claim 1, wherein the polyisobutylenes are not cross-linked.

17. The method according to one of claims 2–16, wherein said vitreous plastic material is selected from the group consisting of polymethyl methacrylate and polycarbonate, and the thermoplastic materials comprise polypropylene.

18. The method according to one of claims 2–16, wherein said vitreous plastic material is in the form of a lens, and said second plastic material is in the form of a lamp body.

19. The method of according to claim 7, wherein said vitreous plastic material is in the form of a lens, and said second plastic material is in the form of a lamp body.

20. The method of claim 7, wherein said poly-α-olefins are selected from the group consisting of polyethylene, polypropylene and poly-1-butene and combinations thereof and exhibit a high tacticity in the crystalline regions.

21. A lamp for a vehicle comprising:
a lens, said lens being made of a vitreous plastic material having a scratch-proof coating; and
a lamp body made of a material selected from the group consisting of thermoplastics and thermosetting plastic materials, wherein said lens and said lamp body is bonded together with a hot-melt adhesive containing:
(a) from 0.5 to 15% by weight thermoplastic elastomers wherein the thermoplastic elastomers comprise grafted thermoplastic elastomers in a quantity of 0 to 100% by weight of total thermoplastic elastomers content;
(b) from 5 to 40% by weight poly-α-olefins wherein the poly-α-olefins comprise grafted poly-α-olefins;

(c) from 5 to 45% by weight adhesive resins;
(d) from 15 to 55% by weight polyisobutylenes, wherein the polyisobutylenes comprise polyisobutylene oils having an average molecular weight of from 200 to 20,000 g/mol in a quantity of 0 to 30% by weight of total adhesive;
(e) from 0 to 50% by weight fillers; and
(f) from 0 to 10% by weight aromatic resins, stabilizers, or a combination thereof,
wherein the total amount of thermoplastic elastomers, poly-α-olefins, and adhesive resins is equal to or less than 63.7% by weight.

22. The lamp for a vehicle of claim 21, wherein the hot-melt adhesive contains from 0.5 to 10% by weight thermoplastic elastomers, wherein the thermoplastic elastomers comprise grafted thermoplastic elastomers in a quantity of 0 to 100% by weight of total thermoplastic elastomers content.

23. The lamp for a vehicle of claim 21, wherein the hot-melt adhesive contains from 10 to 35% by weight poly-α-olefins.

24. The lamp for a vehicle of claim 21, wherein the hot-melt adhesive contains from 15 to 40% by weight adhesive resins.

25. The lamp for a vehicle of claim 21, wherein said thermoplastic elastomers are selected from the group consisting of styrene-containing thermoplastic elastomer, elastomer alloys, polyurethane, polyether esters, and polyether amides.

26. The lamp for a vehicle of claim 21, wherein said poly-α-olefins are selected from the group consisting of amorphous poly-α-olefins, homopolymers, copolymers, and terpolymers of the monomers ethene, propene, 1-butene, 1-pentene and 1-hexene, and poly-α-olefins of general formula (I)

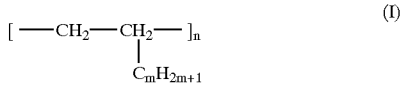

wherein
m=0 to 15, and
n=5 to 2000.

27. The lamp for a vehicle of claim 26, wherein said poly-α-olefins have partial crystallinity.

28. The lamp for a vehicle of claim 26, wherein said poly-α-olefins are random grafted with olefinically unsaturated compounds selected from the group consisting of maleic anhydride, itaconic anhydride, tetrahydrophthalic anhydride, and compounds of general formula (II)

wherein
$R_1$ represents residues of the kind (a)

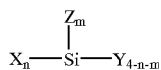

wherein
Z represents hydrogen, a methyl residue or a phenyl residue;

X represents

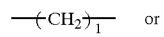

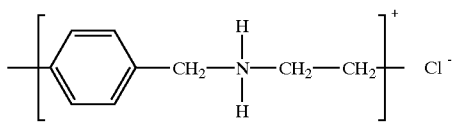

Y represents any hydrolyzable group;
m represents an integer of 0, 1 or 2;
n represents an integer of 0, 1 or 2; and
l represents an integer of 1, 2, 3, 4, 5, or 6; or (b)

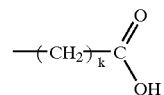

wherein
k represents an integer of 0, 1 or 2;
$R_2$ represents hydrogen or methyl;
$R_3$ represents a residue $R_1$, hydrogen or methyl; and
$R_4$ represents hydrogen or methyl.

29. The lamp for a vehicle of claim 28, wherein said thermoplastic elastomers are random grafted with olefinically unsaturated compounds selected from the group consisting of maleic anhydride, itaconic anhydride, tetrahydrophthalic anhydride, and compounds of said general formula (II).

30. The lamp for a vehicle of claim 21, wherein said adhesive resins are selected from the group consisting of polymerized monomers of the petrochemical $C_5$ to $C_9$ cut which are not hydrogenated, or are partially hydrogenated, polymerized monomers of the petrochemical $C_5$ to $C_9$ cut which contain aromatic groups, natural colophonium resins and their modifications, terpene resins, polyterpene resins of β-pinene, polyterpene resins of α-pinene, polyterpene resins of δ-limonene, and resins obtainable by the copolymerization of terpenes with monomers from the $C_5$ to $C_9$ cut of petroleum distillation and terpene phenol resins or combinations thereof.

31. The lamp for a vehicle of claim 21, wherein the polyisobutylenes are selected from a group consisting of homopolymers of isobutylene having an average molecular weight as determined by gel permeation chromatography in the range of from 20,000 to 5,000,000 g/mol, copolymers of isobutylene and a conjugated diene in an amount of 0.3 to 4.5 mole %, based on the copolymer, and terpolymers of isobutylene, divinyl benzene in an amount of 0.01 to 4.5 mole %, and the above conjugated diene, or combinations thereof.

32. The lamp for a vehicle of claim 21, wherein said polyisobutylenes are selected from the group consisting of polyisobutylene oils, oligomers of isobutylene or 1-butene, polymers of isobutylene or 1-butene, and naphthene- or paraffin-based oils obtained by petroleum distillation which are optionally modified and have a average molecular weight in the range of from 200 to 20,000 g/mol as determined by gel permeation chromatography.

33. The lamp for a vehicle of claim 21, wherein said fillers are selected from a group consisting of calcium carbonate, dolomite, titanium dioxide, zinc oxide, silica, baryte, manganese dioxide, and organic fillers.

34. The lamp for a vehicle of claim 21, wherein said stabilizers are selected from the group consisting of epoxides, sterically hindered phenols, amines, thioesters, phosphites, triazine derivatives, piperidine derivatives and benzotriazoles.

35. The lamp for a vehicle of claim 27, wherein said poly-α-olefins are random grafted with olefinically unsaturated compounds selected from the group consisting of maleic anhydride, itaconic anhydride, tetrahydrophthalic anhydride, and compounds of general formula (II)

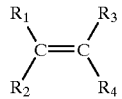

(II)

wherein

R$_1$ represents residues of the kind (a)

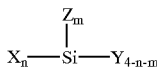

wherein

Z represents hydrogen, a methyl residue or a phenyl residue;

X represents

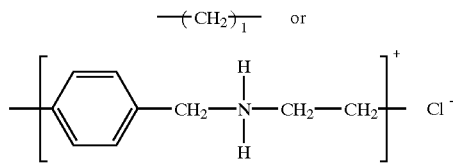

Y represents any hydrolyzable group;
m represents an integer of 0, 1 or 2;

n represents an integer of 0, 1 or 2; and l represents an integer of 1, 2, 3, 4, 5, or 6; or (b)

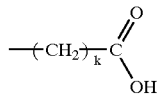

wherein k represents an integer of 0, 1 or 2;

R$_2$ represents hydrogen or methyl;

R$_3$ represents a residue R$_1$, hydrogen or methyl; and

R$_4$ represents hydrogen or methyl.

36. The lamp for a vehicle of claim 21, wherein the polyisobutylenes are not cross-linked.

37. The lamp for a vehicle of one of claims 22–36, wherein said vitreous plastic material is selected from the group consisting of polymethyl methacrylate and polycarbonate, and the thermoplastic materials comprise polypropylene.

38. The lamp for a vehicle of claim 27, wherein said poly-α-olefins are selected from the group consisting of polyethylene, polypropylene and poly-1-butene and combinations thereof and exhibit a high tacticity in the crystalline regions.

* * * * *